United States Patent [19]

Andrews

[11] Patent Number: 5,418,556

[45] Date of Patent: May 23, 1995

[54] METHOD AND APPARATUS FOR REGISTERING MULTIPLE IMAGES IN A COLOR XEROGRAPHIC SYSTEM

[75] Inventor: John R. Andrews, Fairport, N.Y.

[73] Assignee: Xerox Corporation, Stamford, Conn.

[21] Appl. No.: 100,831

[22] Filed: Aug. 2, 1993

[51] Int. Cl.$^6$ .............................................. G01D 15/06
[52] U.S. Cl. ..................................................... 347/116
[58] Field of Search .................. 346/157, 160; 355/327

[56] References Cited

U.S. PATENT DOCUMENTS

| | | |
|---|---|---|
| Re. 32,967 | 6/1989 | St. John et al. . |
| 4,912,491 | 3/1990 | Hoshino et al. . |
| 4,963,899 | 10/1990 | Resch, III . |
| 5,175,564 | 12/1992 | Jamzadeh . |
| 5,175,570 | 12/1992 | Haneda et al. . |
| 5,208,796 | 5/1993 | Wong et al. . |
| 5,260,725 | 11/1993 | Hammond ............................ 346/157 |
| 5,266,976 | 11/1993 | Ohigashi et al. ...................... 346/157 |

Primary Examiner—Benjamin R. Fuller
Assistant Examiner—Randy W. Gibson

[57] ABSTRACT

A method and apparatus is provided for registration of color images on a photoreceptor belt. Registration is accomplished by forming, in one embodiment, a chevron-shaped registration marks in non-image areas of the belt. A Raster Output Scanner (ROS) sweeps an output beam across the belt's surface. The beam is modulated in accordance with input video data to form successive color images. An unmodulated beam is also swept across the registration marks, each mark being successively swept by a plurality of beams. With each crossing of the legs of the chevron, two signals are generated by an associated sensor and stored in an averaging and extrapolation circuit. The multiple signals are compared and detection of the intersection is calculated by an extrapolation method. The averaging circuitry generates a registration signal which is used to enable an accurate start of page signal, to correct for skew and to adjust for errors and line-to-line spacing between lines in a color image frame.

8 Claims, 5 Drawing Sheets

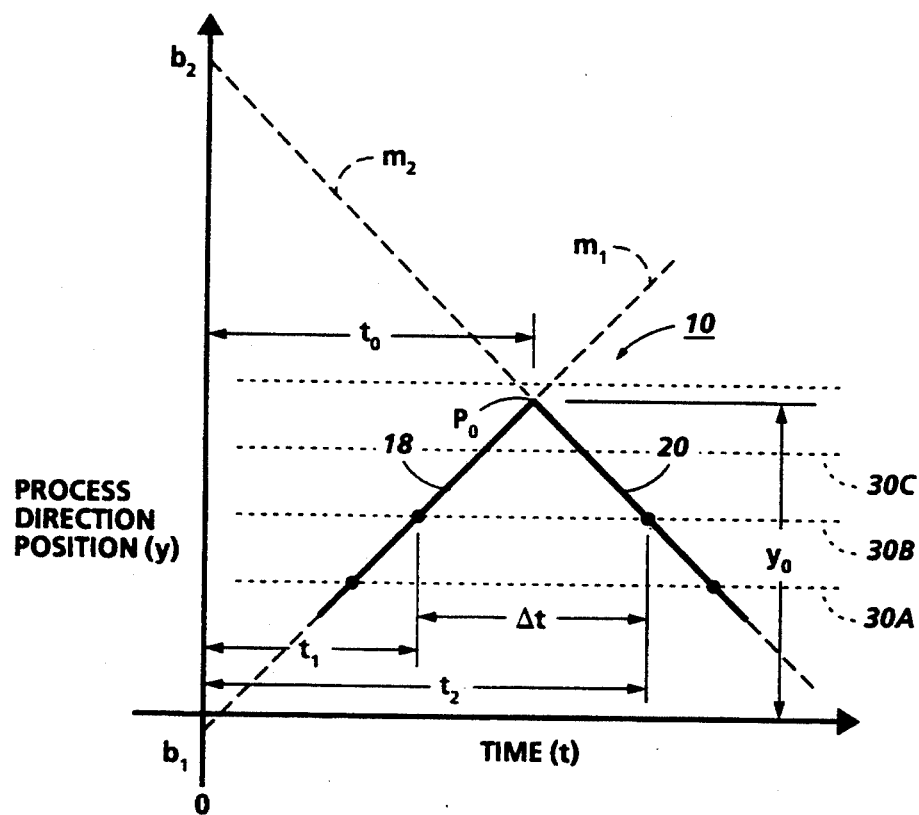
FIG. 2A START OF SCAN
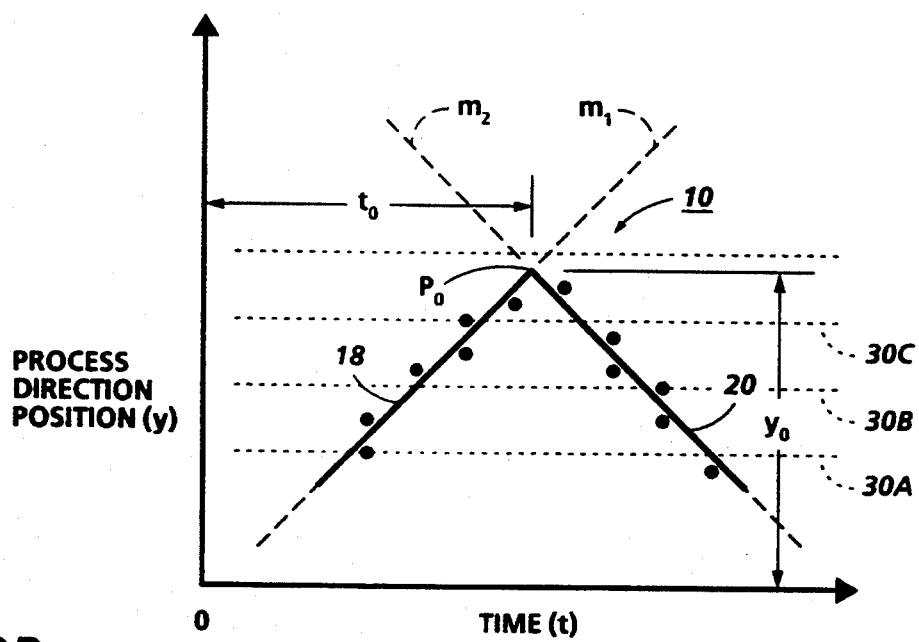
FIG. 2B START OF SCAN

METHOD AND APPARATUS FOR REGISTERING MULTIPLE IMAGES IN A COLOR XEROGRAPHIC SYSTEM

BACKGROUND AND MATERIAL DISCLOSURE STATEMENT

The present invention relates generally to a color xerographic system, and, more particularly, to a system which incorporates a photoreceptor belt having registration marks on the surface thereof whose location must be precisely detected for image registration purposes.

High speed copiers and digital printer machines typically employ a photoreceptor belt as the imaging media since the belt can provide significantly more area to form a plurality of latent images during a single pass or revolution when compared to a machine with a photoreceptor drum as the imaging surface. In a color copier, a plurality of image exposures are formed, developed and transferred to an output paper sheet in either a single or multiple pass mode, to form a composite color output image. The position of the belt during operation must be known with a great deal of precision since the system timing control must ensure that the images are formed within preselected frames on the photoreceptor surface and each subsequent image is superimposed (registered) with previously formed images. The image exposures must be coordinated with the development, transfer and paper feeding functions. Registration errors occur because the belt is subject to changes in physical size and its rotational speed may vary because of mechanical wear and mechanical tolerances in the drive components. These errors are manifested in the output copies which may exhibit color separation, color bleeding and/or other defects which make the output copies unsuitable.

Various techniques have been developed in the prior art to compensate for these errors. One method is to form registration marks on the surface of the belt, either at manufacture or by exposing the belt in non-image areas to form the mark. The latent image of the mark can then be sensed or, alternatively, the latent image of the mark can be developed and sensed in conjunction with an illumination source.

The following patents contain disclosure of techniques for sensing marks placed on the photoreceptor belt for various purposes.

U.S. Pat. No. 4,912,491 discloses an apparatus for forming superimposed images and registration marks corresponding to the position of the images associated therewith. The registration marks are formed apart from the imaging portion of the medium in a transparent area to be illuminated from the opposite side of the belt. Detectors sense the position of the registration marks as the marks pass between the illuminated areas. The sensing of the registration marks is used in determining proper registration positioning, whereby the image forming devices may be adjusted to achieve such registration.

U.S. RE. Pat. No. 32,967 discloses a web tracking system for a continuous web which passes along a predetermined path through one or more processing stations. The tracking system has aligned tracking indicia on one or both sides of the web and detectors sense these indicia which are indicative of dimensional changes in width and length of the web at a particular point. An edge sensor is also provided to determine movement of the web.

U.S. Pat. No. 5,175,570 discloses a color image forming apparatus which forms registration marks 1a, 1b, either as holes formed in the belt or as marks formed on the belt surface. The marks are then sensed and used to adjust the position of the latent image.

U.S. Pat. No. 5,175,564 discloses a color printer which senses a mark on a drum and generates a print enable signal which is used to generate the subsequent image lines.

U.S. Pat. No. 4,963,899 discloses a color copier which uses a single imaging station to form successive color images during multiple passes of a photoreceptor belt. Registration marks are formed on the belt and are sensed for purposes of color image registration.

U.S. Pat. No. 5,208,796 discloses a color system which detects the passage of either holes formed in the belt surface or marks formed on the belt surface to generate transverse error correction signals.

Co-pending application, U.S. Ser. No. 07/930,642, filed Aug. 17, 1992, assigned to the same assignee as the present invention, discloses an apparatus and method of positional tracking of a moving photoconductive belt and adjusting an imager in an electrophotographic printing machine to correct for alignment errors when forming a composite image. Registration errors are sensed by developing an appropriate set of target marks, detecting the target marks, and controlling the position of the imager.

For these prior art, mark-detecting systems, the instantaneous position of the mark is sensed. Exact determination of the center of the registration marks within the desired accuracy of plus or minus 5-10 microns is difficult because of the "noise" factor. Noise is attributable to stray light, variations in the registration mark and the distance between the photoreceptor belt and the detector. Also, for those systems using a laser Raster Output Scanner (ROS) as the imager, additional noise is created by asymmetry in beam shape, variation in the intensity of the laser source, and wobble of the rotating polygon.

According to the general principles of the present invention, at least one registration mark is formed in a non-image area of the photoreceptor belt and successively illuminated by an imager (in a preferred embodiment a ROS). Each illumination of the mark is detected by a photodetector to provide output signals representative of the instantaneous position of the mark. These output signals are processed in a signal averaging circuit to enable very precise determination of belt position. Using signal averaging techniques, the accuracy of the mark detection is improved over the accuracy of a single measurement by a factor equal to $1 \div \sqrt{n}$, where n is the number of measurements.

In a first embodiment, a registration mark in the form of a chevron or a "V" mark is formed on one side of the belt in a non-image area and, during each scan, a ROS imager scans across the chevron with a plurality of scans. Light reflected from the mark is detected and each scan produces signals representing a new pair of measured data points. Each measurement is extrapolated using a least squares fitting technique to predict the intersection of the two legs of the chevron with a high degree of precision. A signal is generated which is used for both start of page registration (first scan line of the first image frame) as well as lateral registration (first pixel on the start of each image scan line). In a second embodiment, two chevron marks are formed at opposite sides of the belt in non-image areas; scan line crossings of the mark are then averaged and compared in time to generate skew correction signals. In a third embodiment, a cluster of overlapping chevron marks are formed in a location separate from the previous marks and line scans across the overlapping marks are measured to produce very accurate line-to-line scans within each image frame. More particularly, the present invention relates to an electrographic printer, which incorporates a photoreceptor belt which moves along a preselected path,

- imaging means for forming a plurality of registered color images with a plurality of scan lines on the surface of said belt, said color images formed in overlying registration to form a composite color image,
- means for forming at least one registration mark on the surface of said belt,
- means for sensing a plurality of scan lines crossing said mark, each scan line generating two output signals representing two detection points of said mark, and
- means for averaging the signals representing the mark detection and for generating output signals for controlling the operation of the imaging means to register said color images.

DESCRIPTION OF THE DRAWINGS

FIG. 2A is an enlarged view of one of the registration marks of FIG. 1, being scanned by a succession of scan lines.

FIG. 2B is the view of FIG. 2A showing the effect of noise on measured data points of the registration marks.

DESCRIPTION OF THE INVENTION

Figure 4:
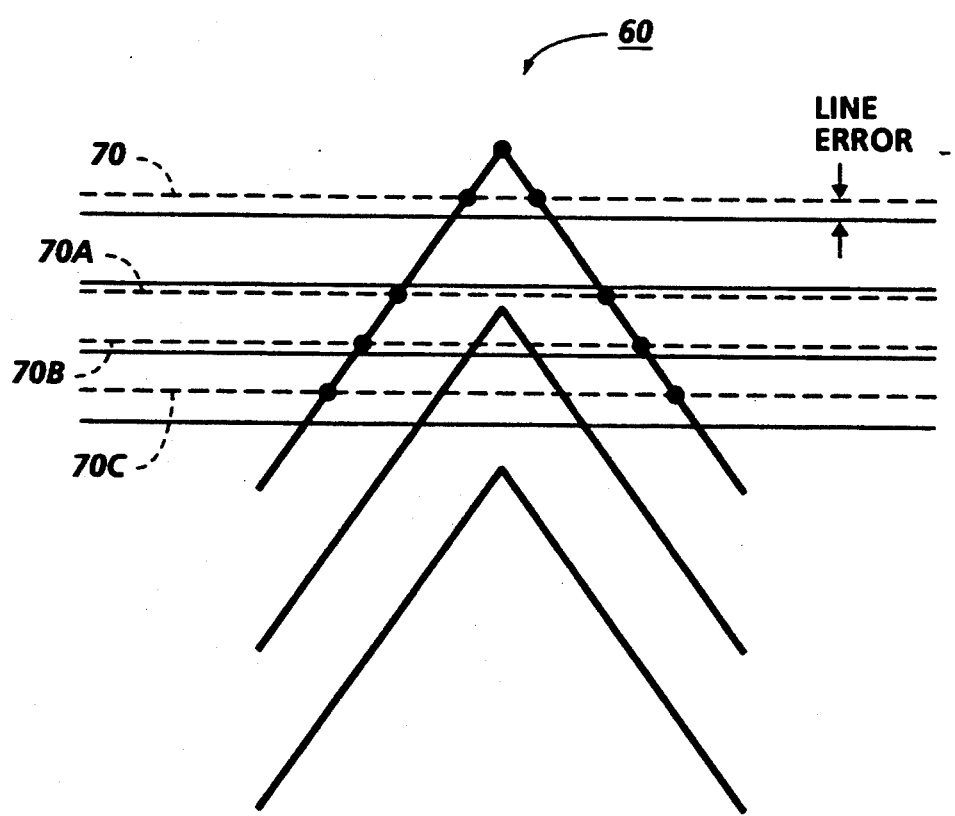
FIG. 4 shows the view of FIG. 3 with additional overlapping chevrons added for line-to-line registration purposes.

The invention, in a preferred embodiment, is practiced in a color printer of the type disclosed in application Ser. No. 07/930,642, whose contents are hereby incorporated by reference. In FIG. 4 of that application, a color printer is shown which includes raster output scan (ROS) imaging stations. The ROS performs the function of creating the output image copy on a photosensitive surface of the belt by successively scanning the belt surface with a series of modulated scan lines, each line having a certain number of pixels per inch to form the latent images, which are subsequently developed, transferred to an output sheet and fused. The process may be used in either a single pass system wherein a plurality of imagers and developing and charging stations are used or in a multiple pass system where a single imager station forms images which are developed and returned for further imaging and development. The ROS is also controlled to form latent registration images outside of the image frame. These latent images are subsequently developed to form visible registration marks. Preferably, the latent mark image is developed with a black toner for better light attenuation when the mark is illuminated. Using the ROS and the control electronics described in the aforementioned application, and referring to FIG. 1 of the present invention, a pair of registration marks 10, 12 are formed on the surface of the belt 14 moving in the direction of arrow 16. Each mark is in the shape of a chevron or "V" formed outside of the image area and in a space preceding the first scan line 24A of a first image frame 24. Mark 10, shown enlarged in FIG. 2, consists of side segments 18, 20 converging to an apex identified as point $P_0$. The mark is shown inverted from the position shown in FIG. 1 to permit conventional axis notation. The mark is formed by a ROS as disclosed in the aforementioned application Ser. No. 930,642. Mark 12 is formed in a similar fashion. The position of Po is made coincident with the center of the first line 24A of frame 24. The first image pixel P1 of line 24A is formed after a predetermined time delay; associated with a signal from a conventional start of scan (SOS) sensor (not shown) positioned above the belt surface. Pixel Pn is the last image pixel of line 24A. It is assumed that the system registration requirement is for subsequent color images to be superimposed on the first exposed and developed image frame 24 within a ±5-10 micron tolerance. A scanning beam from the ROS sweeps across the surface of belt 14 to repeatedly form a succession of scan lines 30. It is understood that the scanning beam is unmodulated in non-image areas and is modulated in image areas to form a latent color image. The ROS imaging station has associated with it a pair of integrating cavity photodiode detectors 32, 34 positioned above the surface of the belt and in line with the path of motion of marks 10 and 12. Each detector has a slit entrance to receive light reflected from the marks when the marks move into the ROS scanning zone as will be seen. The belt 14 moves in the process direction (arrow 16) bringing marks 10 and 12 into the path of beam 30. As the marks continue their movement, the scanning beam is swept or scanned in intervals of 100 to 400 nsec forming sequential scan lines 30A, 30B, 30C.

Figure 1:
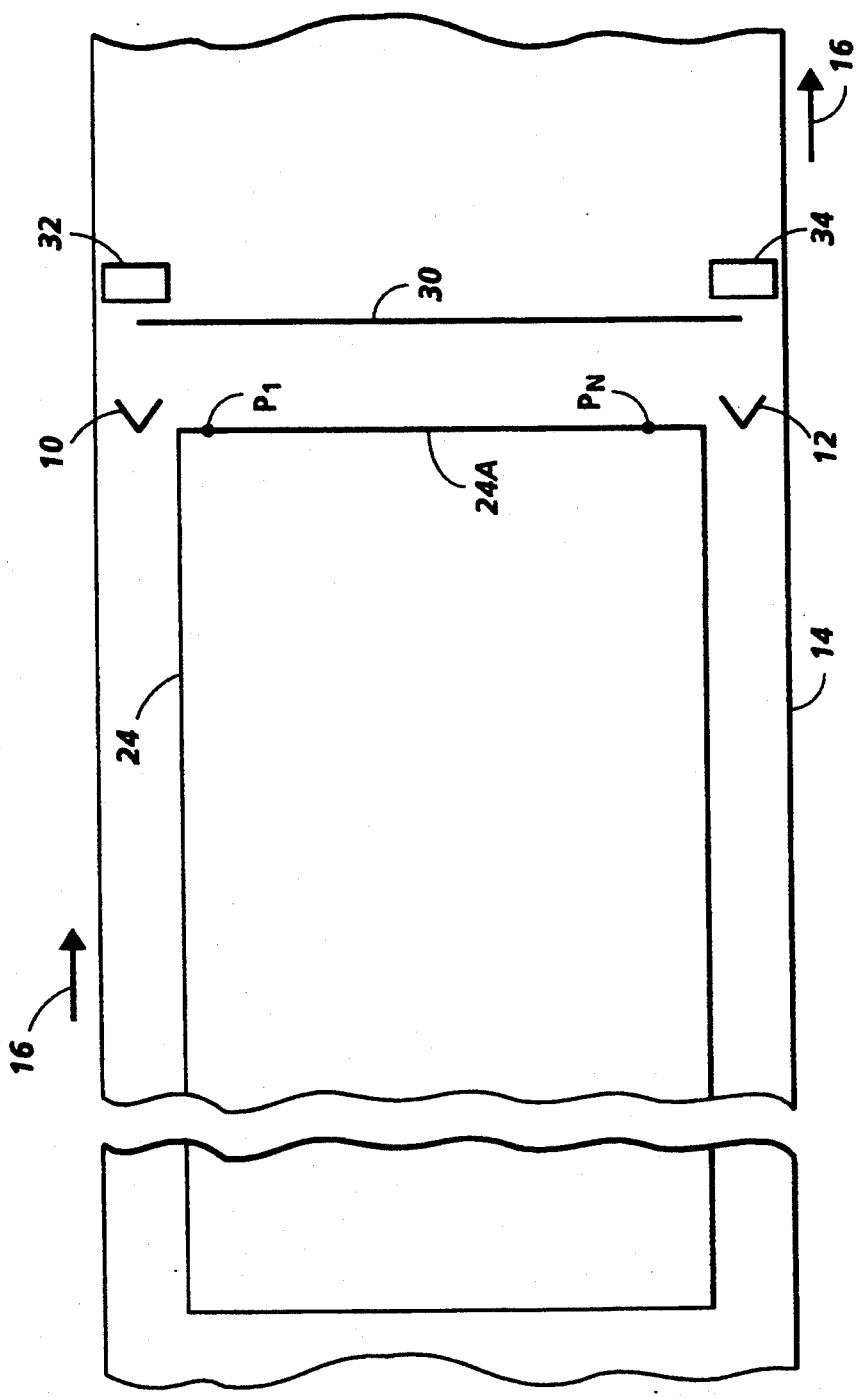
FIG. 1 is a top perspective view of a portion of a photoreceptor belt having chevron registration marks formed thereon.
Figure 5A:
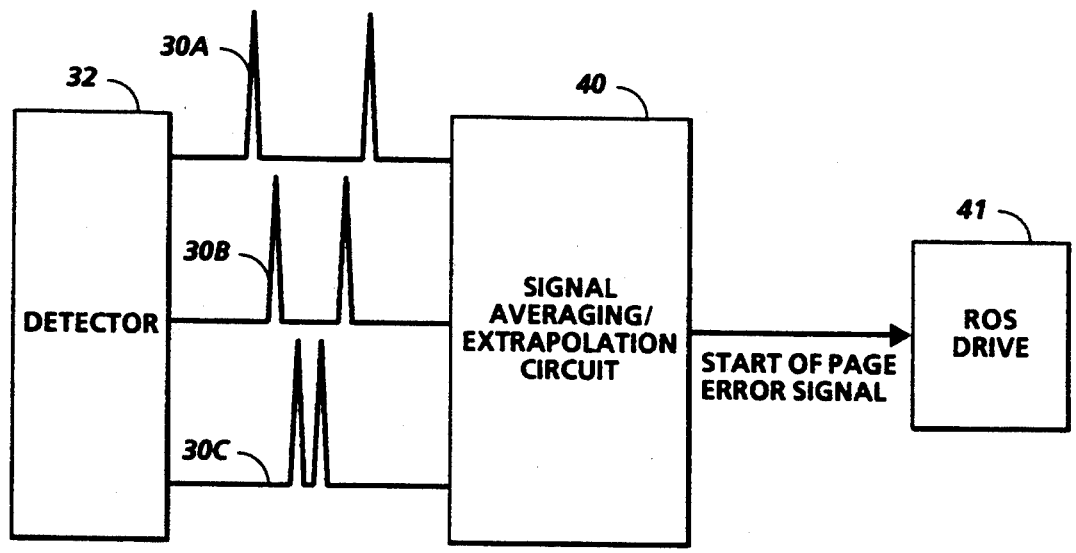
FIG. 5A is a schematic block diagram of the registration control circuits to generate the start of page registration signals, which incorporates a signal averaging circuit.

Referring still to FIGS. 1, 2, and 5A, a first scan line 30A crosses legs 18, 20 of mark 10 at the open (wide) end. The crossing results in a scattering of light creating two identified output signals at detector 32. These outputs are sent to a signal averaging/extrapolation logic circuit 40. Subsequent scans 30B and 30C produce additional signal outputs whose spacing becomes progressively shorter. The current output signals from the detector are converted into a voltage level and stored in signal averaging logic in circuit 40. Because of the fast scan line, each detector 32, 34 generates signals for a short time period in the order of 100 to 200 nsec. Fast response circuitry such as that disclosed in application U.S. Ser. No. 970,889, whose contents are hereby incorporated by reference, disclose circuits to achieve the requisite voltage levels. Circuit 40 contains timing and comparison logic circuits for performing an extrapolation of the incoming data and calculates the intersection of the two sides 18, 20 of mark 10 (e.g. calculates $P_0$ 22) based on the time shortening in the spacing between the two detected lines. Once the determination is made, a start of page (line sync) signal is sent to the ROS drive 41 to control printing of the first line of the next image centered on the predicted position of $P_o$. More specifically and referring to FIGS. 2A and 2B, the reference points to be determined (point $P_o$) has coordinates $t_o$, $Y_o$. The coordinates of $P_0$ can be determined from the intersection of the two lines that are extrapolations of the line segments 18, 20 of the chevron given by the expressions:

$$t_0 = \frac{b_2 - b_1}{m_1 - m_2} \quad (1)$$

and $$y_0 = \frac{m_1 b_2 - m_2 b_1}{m_1 - m_2} \quad (2)$$

where $m_1$ and $m_2$ are the slopes and $b_1$ and $b_2$ are the y-intercepts of the best fit lines through the chevron line segments. The data for use in the determination of the line is obtained as shown in the FIG. 2A. The delay time from the start of scan position determined in the imager reference frame (say from a SOS sensor mounted on the imager frame) correspond to the x-axis data. The y-axis data correspond to the scan number. The y-axis values used to determine the line can be treated as integers, or scaled through an assumed or measured photoreceptor scan velocity. In a real system the data points collected by the scanner system will not necessarily lie precisely on line segments 18, 20 of the chevron. Various noise sources can lead to errors in determination of the exact line position as represented by the data points shown in FIG. 2B. In the case of such noise, it is necessary to determine the best line through the noisy data. Fitting of a line to the data can be done to determine the slopes and intercepts of the two lines that correspond to the legs 18, 20 of chevron 10. While several procedures might be used to determine the best lines through the data, the most commonly used, and the one described herein is called linear regression. This procedure is implemented on many hand held calculators. The linear regression procedure determines the best line by minimizing the sum of the squares of the differences between the calculated line and the data. In this system, certain parameters might be known or constrained so that the linear regression procedure can be modified, in ways well known in the art, to make use of the constraints. An example of a constraint is that if chevron 10 is symmetric, then $m_1 = -m_2$. Furthermore, the average value of the slope is known at the time of creation. Other constraints on the relationships between the line parameters might be appropriate. Once three or more data points on each line have been accumulated (two scan line might be sufficient in the presence of constraints), it is possible to determine the best pair of lines through the points, it is also possible to determine the error in the free parameters describing the lines and consequently the error in determining the coordinates of the registration $P_0$. When the error value is below a prescribed value, then the data can be used to activate timing or some other adjustment to implement registration. The calculated value of $t_0$ gives the start of line position. The calculated value of $y_0$ gives the start of page position. If $y_0$ does not correspond precisely to the predicted position of a future scan line, then an error signal is generated and sent to the ROS driver 41 (FIG. 5A), which is then used to drive an actuator to move the scan line relative to the photoreceptor so that the predicted scan line would intersect the extrapolated point $P_0$. At this point the error signal would go to zero and registration would be achieved.

The above procedure for a start of page registration can be considered as using slow scan (process direction) coordinates to determine the position of the start of the page. The start of the image (pixel P1) can be considered the fast scan and requires a fast scan coordinate. In an asynchronous clock system, the system clock is triggered so that pixel P1 is laid down after the same delay from mark 10 detection used in the first exposure station. The end of scan coordinate (pixel Pn) can be located using detection of mark 12 by detector 34, in conjunction with an end of scan (EOS) sensor (not shown).

Figure 3:
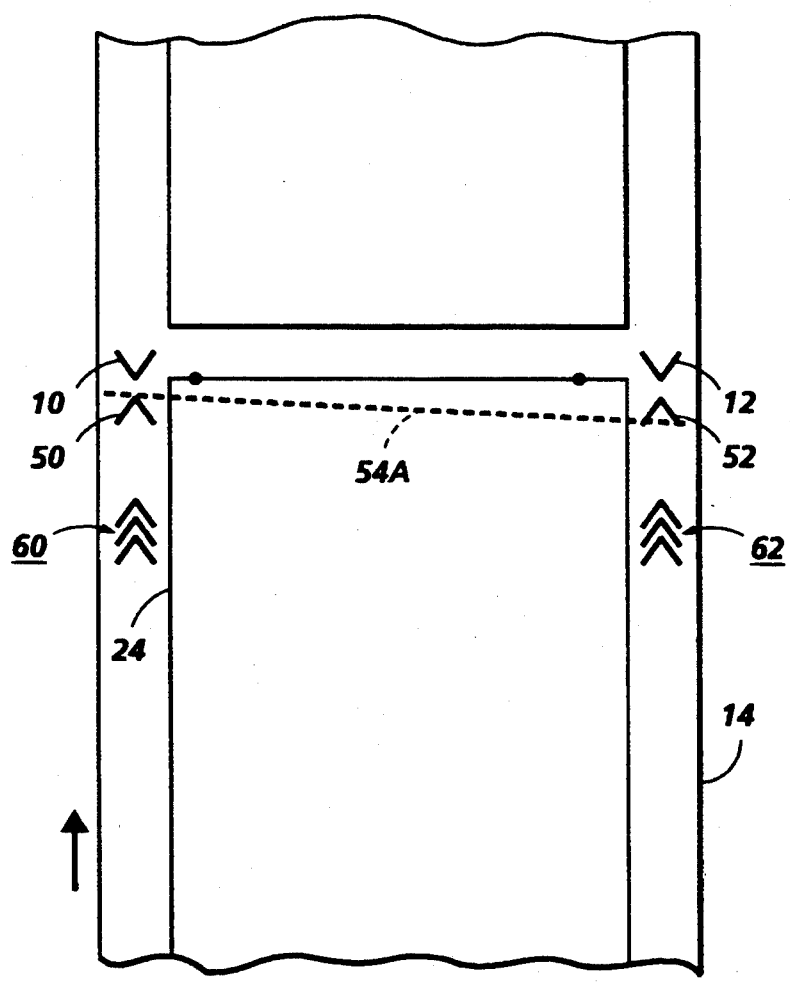
FIG. 3 shows the view of FIG. 1 with additional registration marks formed on the belt for skew registration purposes.
Figure 5B:
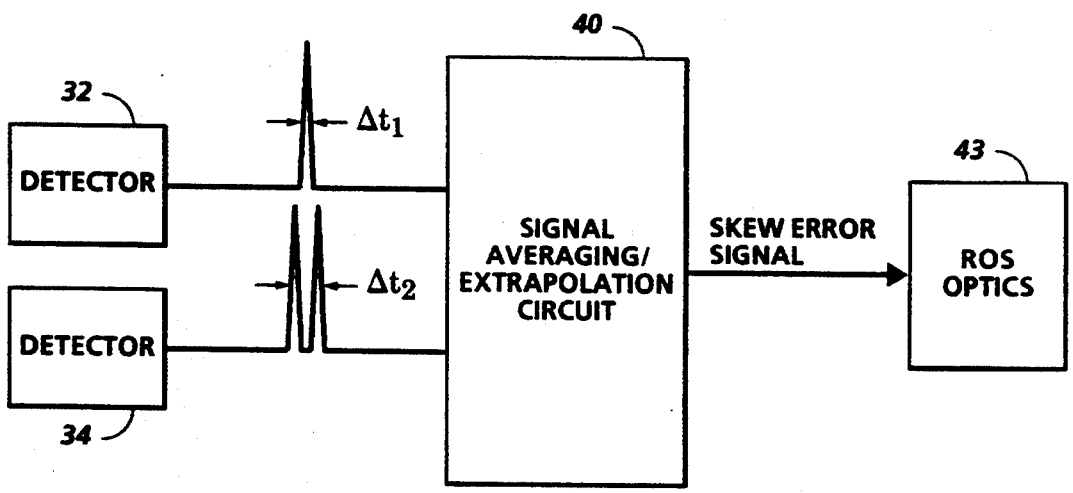
FIG. 5B is a schematic block diagram of the registration control circuit for the skew registration, which also incorporates the signal averaging circuit of FIG. 5A.

In addition to the start of page and fast scan registration, a skew registration must also be accomplished. The ROS imager is positioned to scan in a straight line laterally across the belt. However, in the case of successive ROS imager stations which are skewed with respect to each other, the scan lines for each station are formed at different angles causing a skewed output image. Skew can result, for example, from twisting of the ROS frame or from unequal stretching of the photoreceptor belt. Skew registration can be enabled by adding another chevron registration pair 50, 52 as shown in FIG. 3. The chevrons can be located at any non-image area. FIG. 3 shows a scan line 54A being formed by a ROS at an angle across the belt surface. It is apparent that the signals generated by the detector sensing scan line 54A crossing the two legs of mark 50 will be different from the signals generated when the line sweeps across mark 52. FIG. 5B shows the wave form sensed when the beam crosses mark 50 ($\Delta T1$) compared to the signals generated when the beam crosses mark 52 ($\Delta T2$). Using the procedures described above, comparison circuitry in circuit 40 generates correction signals in a feedback loop which modify the position of optical elements in the ROS optics 43 (mirrors or a lens) to straighten the scan line until the condition $\Delta T1$ equals $\Delta T2$ is achieved. An example of a skew correction in which stepper motors are operated by signals generated from the detectors is disclosed in application Ser. No. 970,889 assigned to the same assignee as the present invention whose contents are hereby incorporated by reference.

The third registration to be accomplished is the maintenance of the same spacing between successive scan lines within the same image frame. For this registration, a cluster of overlapping chevron marks shown as 60, 62 in FIG. 3 is formed. One set, 60, is shown enlarged in FIG. 4. It is assumed that the skew error adjustments have been made. Each chevron cluster is scanned by a succession of scan lines 70-70C with the position of each line being measured along data points. Signals generated by the detector for each chevron crossing are extrapolated, averaged and stored in the manner described for the start of page registration supra. After several samples, sufficient data is stored so that a prediction can be made as to when the next line should be detected. This predicted time is to be compared to the actual detected time, and if a deviation is found, a slow scan (line) error signal is generated and sent to ROS driver 41.

The sign and magnitude of the deviations are used as correction signals to the ROS drive 41 to adjust for line-by-line registration.

The above description of the invention provided registration techniques incorporating a chevron registration mark pattern swept by a ROS imager. The invention is also useful in systems where the imager is an LED or LCD print bar which is selectively pulsed to form a latent image. For this case, a dedicated light source is positioned above this belt surface and is strobed in the pattern area to obtain the timing information. Each strobe thus simulates a ROS sweep. Other mark configurations may be used; the only constraints are that there are two detection points per scan and that the two edges being detected are not parallel. The invention can also be practiced in a tandem engine system where images may be formed on one or more photoreceptor drums and transferred in succession to an intermediate belt and then transferred to output paper. The marks are then formed on the photoreceptor drum and transferred to a transfer web where they are detected as described above.

Another advantage of the present registration technique is to generate warning signals when registration errors become larger than the predetermined value. Such a warning condition might then lead to implementation of other corrective measures, such as a visual or audible message to the machine user or transmittal of a message to a service center.

While the embodiment disclosed herein is preferred, it will be appreciated from this teaching that various alternative, modifications, variations or improvements therein may be made by those skilled in the art, which are intended to be encompassed by the following claims:

I claim:

1. In an electrographic printer, which incorporates a photoreceptor belt which moves along a preselected path,
    imaging means for forming a plurality of registered color images with a plurality of scan lines on the surface of said belt, said color images formed in overlying registration to form a composite color image,
    means for forming at least one registration mark on the surface of said belt,
    means for sensing said plurality of scan lines which cross said mark, and generating two output signals representing two detection points of said mark for each of said scan lines which cross said mark, and
    means for averaging the and extrapolating the signals for all of said scan lines and generating signals to control the operation of the imaging means to register said color images.

2. The machine of claim 1 wherein a Raster Output Scanner (ROS) is used as the imaging means for forming the color images and the registration marks.

3. The machine of claim 2 wherein each registration mark is a chevron with two legs joining at an intersection point $P_0$, $P_0$ defined by coordinates $t_0$ and $y_0$ which in turn are defined by the expressions:

$$t_0 = \frac{b_2 - b_1}{m_1 - m_2} \quad (1)$$

and $$y_0 = \frac{m_1 b_2 - m_2 b_1}{m_1 - m_2} \quad (2)$$

4. The machine of claim 3 wherein said averaging and extrapolating means contains comparison logic circuitry for comparing and extrapolating said output signals and for predicting said intersection point $P_0$ and for generating an error signal representing a correction to the ROS start of scan line.

5. The machine of claim 3 wherein two registration marks are formed at opposite sides of the belt in non-image areas and wherein the plurality of scan lines crosses both marks to generate sets of output signals which are used to derive a skew registration signal.

6. The machine of claim 5 further including two sets of overlapping V-shaped marks on opposite sides of the belt in non-image areas and wherein the plurality of scan lines crosses said overlapping marks to generate signals used to derive an interline registration signal.

7. An imaging system for forming multiple image exposure frames on a photoconductive member during a single pass including:
    a photoreceptor belt adapted to accommodate a formation of an integral number of image exposure frames, said belt having a first and second registration mark on opposite sides of a belt width and outside of the exposure frames,
    a plurality of ROS (ROS) units, each ROS unit associated with a formation of one of said image exposure frames, each of said ROS units forming a plurality of projected scan lines in a fast scan direction across the belt width, said scan lines beginning and ending at points outside of the image exposure frames,
    first and second detecting means associated with each of said ROS units, said first and second detecting means for sensing the projected scan lines when said scan lines intersect said registration marks and generating position signals indicative thereof, and
    means for averaging and extrapolating said position signals and generating predicted start of page signal.

8. A method of lateral registration of a plurality of image exposure frames sequentially formed on a surface of a photoreceptor belt moving in a process direction including the steps of:
    directing multiple scan lines from a plurality of ROS imagers onto the surface of said photoreceptor to form said image exposure frames in response to video data inputs to said ROS imager,
    forming registration marks on the surface of the belt in a non-image area, each of said marks having two segments with a common intersection point, said marks periodically reflecting light from said ROS scan lines as said ROS scan lines are swept across said marks,
    detecting the reflection of light from said marks by photodetectors,
    successive output signals proportioned to the light detected by the photodetectors,
    averaging a plurality of said successive output signals from each of said photodetectors using a linear progression procedure, and
    generating an output signal which is an extrapolation of the averaged signals and obtaining a predictive position of said intersection point.

* * * * *